(12) United States Patent
Nakatani et al.

(10) Patent No.: US 8,079,288 B2
(45) Date of Patent: Dec. 20, 2011

(54) BICYCLE GEAR CRANK

(75) Inventors: Akira Nakatani, Nara (JP);
Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 183 days.

(21) Appl. No.: 12/427,476

(22) Filed: Apr. 21, 2009

(65) Prior Publication Data

US 2010/0050810 A1    Mar. 4, 2010

(30) Foreign Application Priority Data

Sep. 2, 2008    (JP) .................................. 2008-224740

(51) Int. Cl.
*B62M 3/00*    (2006.01)
(52) U.S. Cl. ....................................................... 74/594.2
(58) Field of Classification Search ................. 74/594.1, 74/594.2; 301/2.5; 403/230
See application file for complete search history.

(56) References Cited

U.S. PATENT DOCUMENTS

| 4,441,383 | A | * | 4/1984 | Segawa | 74/594.2 |
| 5,515,746 | A | * | 5/1996 | Yamaguchi | 74/594.2 |
| 2007/0295157 | A1 | * | 12/2007 | Schroeder et al. | 74/594.2 |

FOREIGN PATENT DOCUMENTS

| JP | 2004-090824 | | 3/2004 |
| JP | 2004210134 | A1 * | 7/2004 |
| JP | 2004-338538 | | 12/2004 |
| JP | 2006-123895 | | 5/2006 |
| JP | 2006-160139 | | 6/2006 |

* cited by examiner

*Primary Examiner* — Vicky Johnson
(74) *Attorney, Agent, or Firm* — Michael Best & Friedrich LLP

(57) ABSTRACT

A bicycle gear crank that allows easy and proper circumferential position adjustment of the gear plate with respect to the crank arm. The bicycle gear crank includes a crank arm having a base end provided with a boss for mounting to a crank shaft an annular intermediate member non-rotatably around the boss $11a$; a gear mount 3 which is supported non-rotatably fixed to the intermediate member, gear plates fixed around the gear mount, and a positional adjuster provided by spline fitting for changing relative circumferential position of the gear mount with respect to the intermediate member.

12 Claims, 4 Drawing Sheets

BICYCLE GEAR CRANK

BACKGROUND

The present invention relates to bicycle gear cranks, and more particularly to a bicycle gear crank which includes a crank arm with a boss to mount to a crank shaft, and at least one gear supported by the crank arm.

Bicycles have a gear crank as a front gear, a free wheel as a rear gear and an endless chain which is wound around these gear crank gear and the free wheel gear, as the bicycle driving mechanism. The gear crank gear is fixedly supported by the crank arm. The crank arm has a base end provided with a boss for mounting to a crank shaft which is rotatably supported by a bottom bracket in a frame. The crank arm also has a tip end provided with a pedal. When the gear crank is rotated in normal direction by pedaling, the rotation is transmitted by the endless chain to the free wheel as normal-directional rotation, the rear wheel is turned in the normal direction and thus the bicycle moves in the forward direction. Recently, most bicycles are equipped with some speed changing mechanism. When the mechanism is provided by an external type, i.e. a derailleur system, the free wheel is usually equipped with multiple gears, and in some cases the gear crank is also equipped with multiple gears. This provides a multiple-speed system with as many shift positions as given by a multiplication between the number of gears in the gear crank and the number of gears in the free wheel.

The crank arm may include, integrally therewith, a gear mount which extends radially from the boss (see Patent Document 1). In this case, the gear mount may have some threaded holes while the gear may have some though-holes, and bolts may be inserted through these holes to fixedly support the gear to the gear mount on the crank arm. In other arrangements, a gear mount and a crank arm may be separate members and are connected with each other incapably of relative rotation to each other.

As is well known, the gear may be provided by an oval gear which has its teeth formed on its oval circumference. In bicycles, it is considered that the rider on a bicycle can exert a maximum pedaling force when the pedal on its circular path is ahead of the crank arm boss while the crank arm makes one complete rotation for example. With this idea, an oval gear can provide an advantage: If the oval gear is positioned in such a manner that its major axis comes to a vertical position when the rider can exert a maximum force onto the pedal, then the gear turns as fast as a true-circle gear formed with a greater number of teeth, within a range where the maximum force is being applied. In other words, it is believed that an oval gear will provide a faster speed as compared to a true-circle gear which has the same number of teeth. Due to such a characteristic, an oval gear is often used in racing bicycles.

However, the position of the crank arm when a maximum force is exerted to the pedal varies from one bicycle rider to another, and for this reason, there has been a requirement for adjustment capability on circumferential positioning between the crank arm and the gear.

SUMMARY OF THE INVENTION

The present invention was made under the above-described circumstances, and it is therefore an object of the present invention to provide a bicycle gear crank which allows easy and proper circumferential position adjustment of the gear with respect to the crank arm.

In order to solve the problems described above, the present invention makes use of the following technical means:

A bicycle gear crank provided by the present invention includes: a crank arm which has a base end provided with a boss for mounting to a crank shaft; an annular intermediate member for non-rotatably fitting around the boss; a gear mount non-rotatably supported around the intermediate member; a gear fixed around the gear mount; and a positional adjuster for changing relative circumferential position of the gear mount relative to the intermediate position. According to a preferred embodiment, the gear comprises an oval gear plate.

According to the bicycle gear crank offered by the present invention, the gear mount for mounting the gear is a separate member from the crank arm, and an intermediate member is placed between these members. Then, the intermediate member and the gear mount are adjustable to each other in terms of their relative circumferential positions by using an adjuster. As described, the arrangement with an intermediate member allows relative circumferential position adjustment between the crank arm and the gear without removing the gear, which may be fastened to the gear mount with bolts, from the gear mount, making the positional adjustment easy. This advantage can be enjoyed particularly in cases where the gear is provided by an oval gear because there has been a strong requirement for the above-described adjustment capability specifically for such a configuration.

According to a preferred embodiment, the positional adjuster includes outer splines formed on an outer circumferential surface of the intermediate member, and inner splines formed on an inner circumferential surface of the gear mount for fittingly engaging the outer splines. Such an arrangement as the above simplifies the structure of the positional adjuster with an additional advantage that by increasing the number of splines the arrangement allows fine adjustment on the relative positioning between the crank arm and the gear.

According to a preferred embodiment, the outer splines comprise an odd number of splines. Such an arrangement as the above allows a half-pitch shift by making a partial rotation (about 180 degrees) by about half the number of splines. Thus, the arrangement allows even finer adjustment on the relative positioning between the crank arm and the gear.

According to a preferred embodiment, the boss has an outer splined surface, and the intermediate member has an inner splined surface for fitting on the outer splined surface of the boss. Such an arrangement as the above also simplifies the connecting structure between the intermediate member and the crank arm boss.

Other characteristics and advantages of the present invention will become clearer from the following detailed description to be made with reference to the attached drawings.

BRIEF DESCRIPTION OF THE DRAWINGS

FIG. 4 shows an intermediate member.

DETAILED DESCRIPTION

Hereinafter, a preferred embodiment of the present invention will be described specifically, with reference to the drawings.

Figure 1:
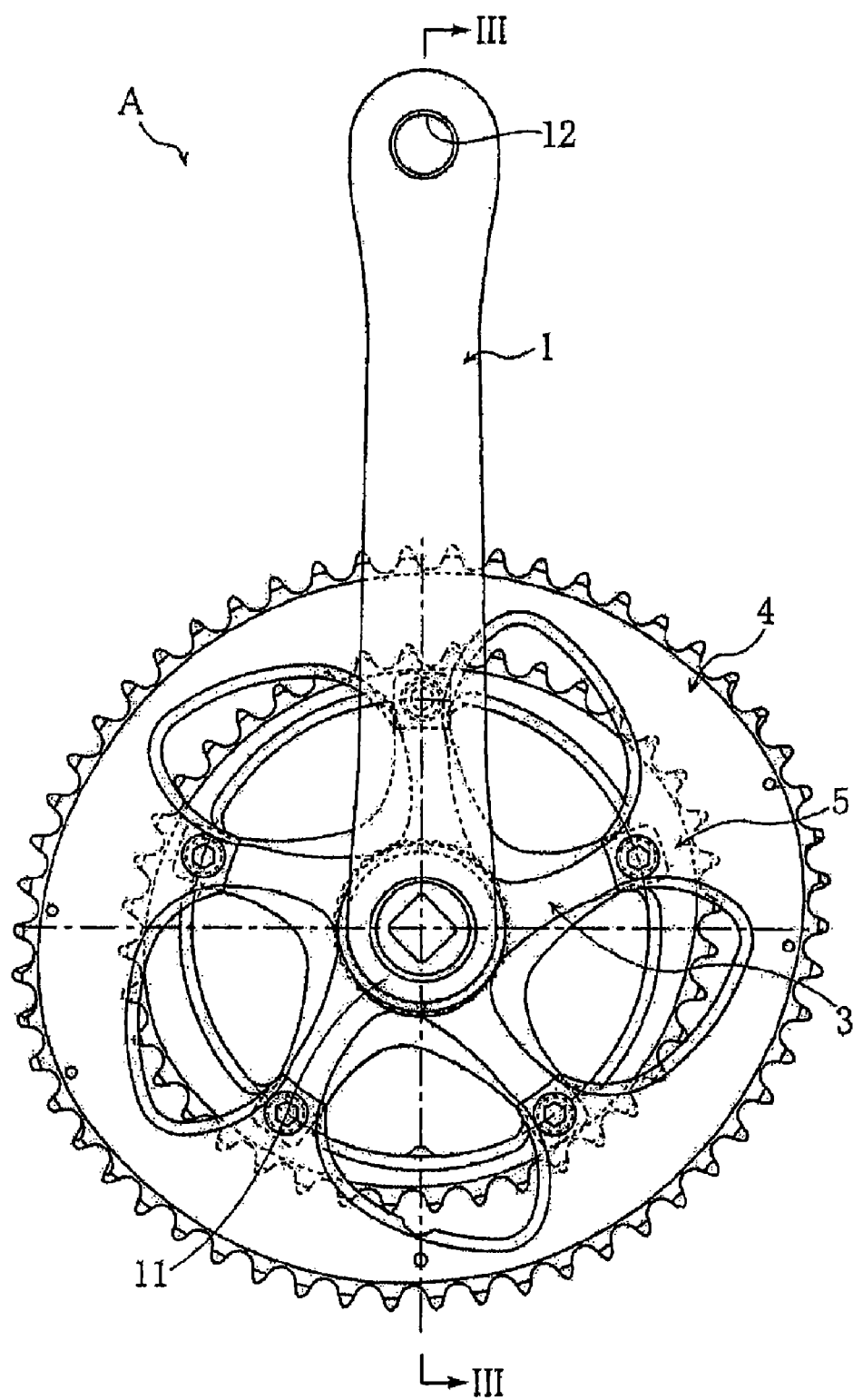
FIG. 1 is a front view of a bicycle gear crank according to the present invention.
Figure 2:
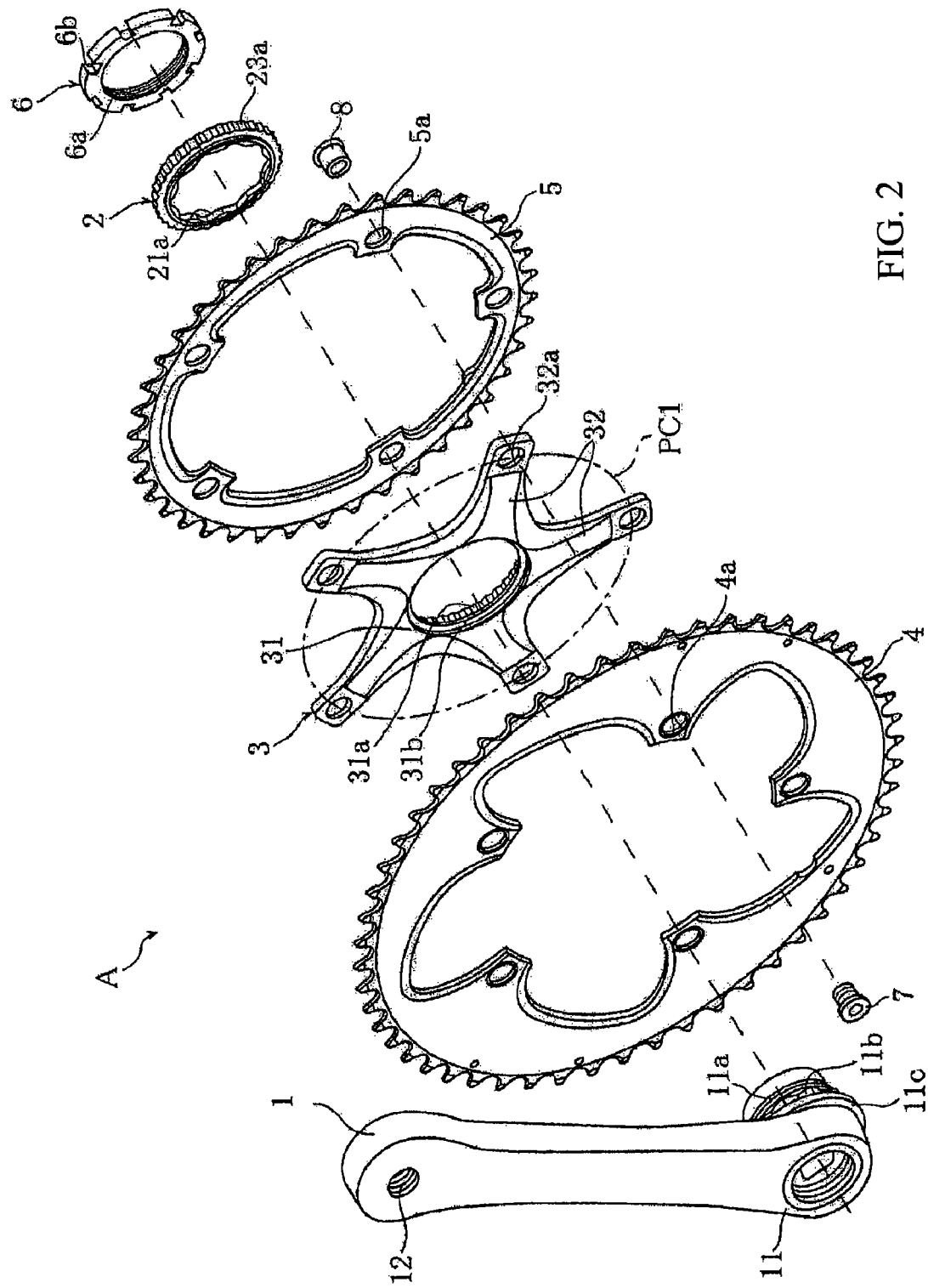
FIG. 2 is an exploded perspective view of the bicycle gear crank in FIG. 1.
Figure 3:
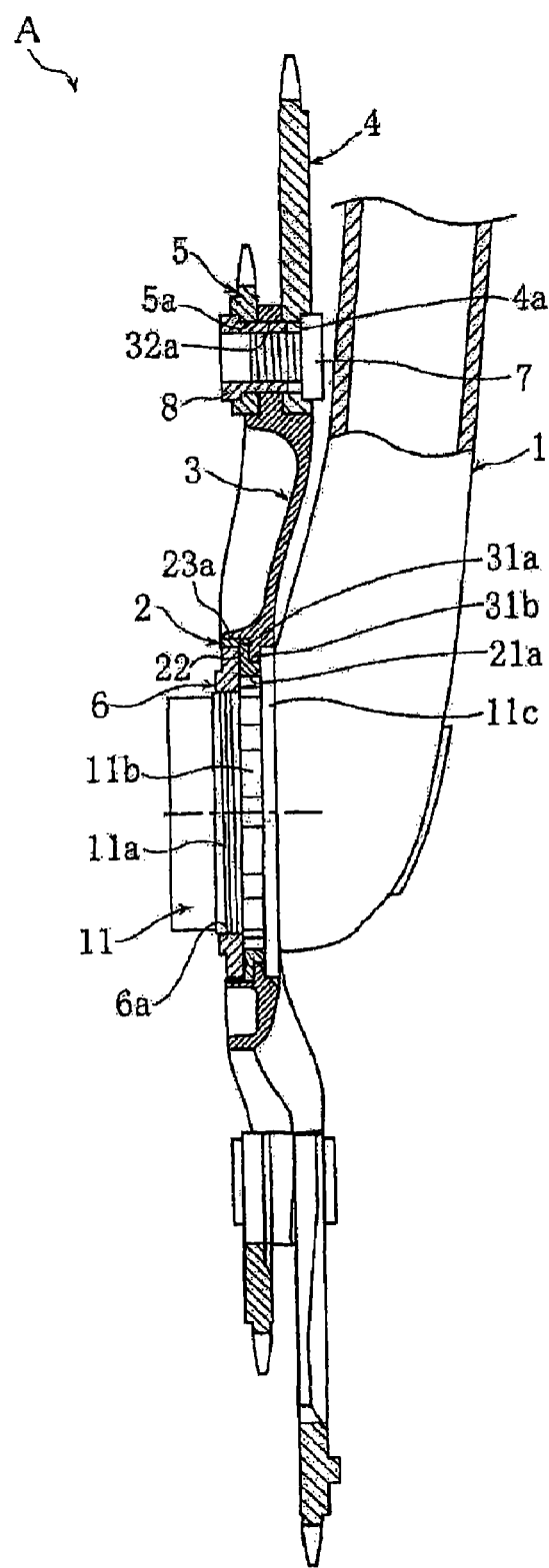
FIG. 3 is a partial sectional view taken in lines III-III in FIG. 1.

FIG. 1 through FIG. 3 show a bicycle gear crank according to the present invention. A bicycle gear crank A according to the present embodiment includes a crank arm 1, an intermediate member 2, a gear mount 3, a set of a large-diameter outer chain ring 4 and a small-diameter inner chain ring 5 as a gear plate, and a rock ring 6.

As shown in FIG. 2 and FIG. 3, the crank arm 1 has a base end provided with a boss 11 for mounting to a crank shaft (not illustrated), and a tip end provided with a threaded hole 12 for accepting a threaded shaft of a pedal (not illustrated). The crank arm 1 has a hollow intermediate arm portion, and is formed by forging for example. The boss 11 has an outer circumference provided with a threaded shaft 11a, outer splines 11b and then an engagement lip 11c in an axial direction of the crank shaft (hereinafter, simply called "the axial direction"). The outer splines 11b comprise an even number of splines. In the present embodiment the number is twelve for example.

Figure 4C:
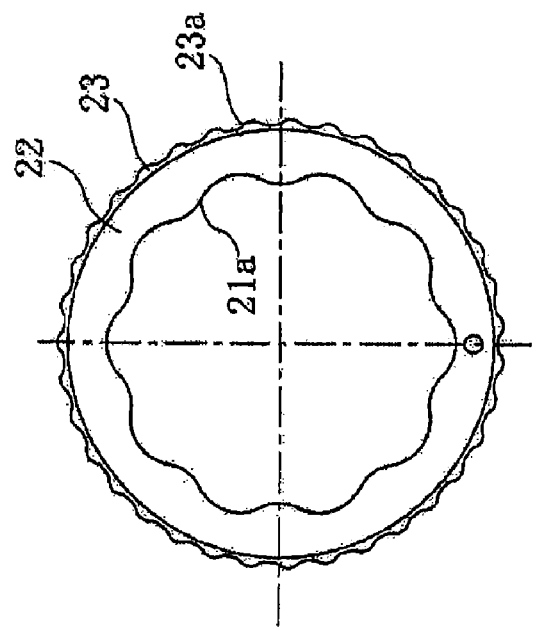
FIG. 4(c) is a rear view.
Figure 4B:
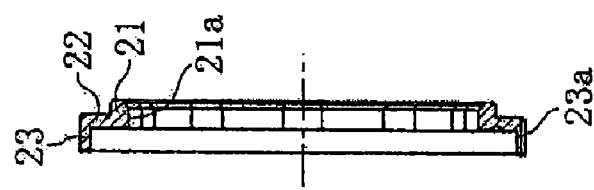
FIG. 4(b) is a sectional view taken in lines IVb-IVb in FIG. 4(a)
Figure 4A:
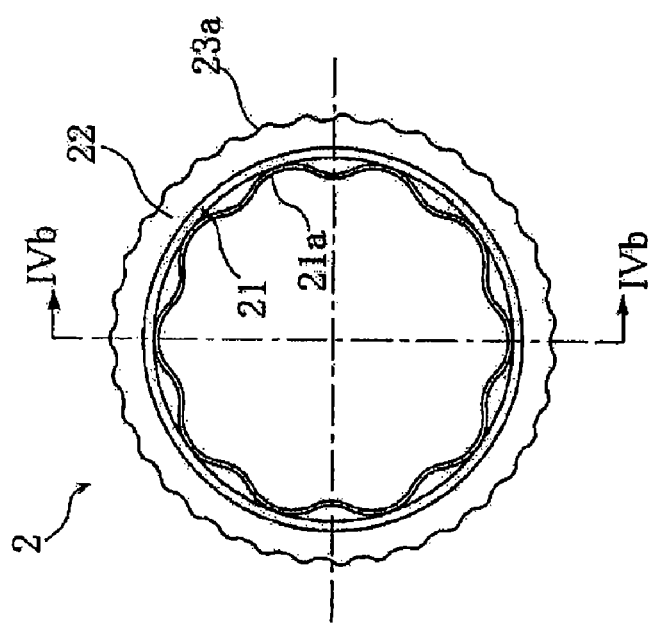
FIG. 4(a) is a front view.

As shown in FIG. 2, the intermediate member 2 is a generally annular member to be placed between the crank arm 1 and the gear mount 3. More specifically, as shown clearly in FIG. 4, the intermediate member 2 has an inner tube portion 21 which is small in diameter, an annular plate portion 22, and an outer tube portion 23 which is large in diameter, and these portions are continual in the axial direction. The inner tube portion 21 has an inner circumference formed with inner splines 21a to be fitted by the outer splines 11b on the boss 11 of the crank arm 1. The outer tube portion 23 has an outer circumference formed with outer splines 23a to fit into inner splines 31a in the gear mount 3 to be described later. The outer splines 23a comprise an odd number of splines which is larger than that of the outer splines 11b of the boss 11. In the present embodiment the number is thirty five for example.

As shown in FIG. 2 and FIG. 3, the gear mount 3 has an annular base portion 31 and five fingers 32 continuing from the base portion 31. The fingers 32 are spaced equally around the base portion 31, extending radially outward from the base portion 31. The fingers 32 have their tips provided with a though-hole 32a for mounting the outer chain ring 4 and the inner chain ring 5. These though-holes 32a have their centers arranged on the same pitch circle PC1. The base portion 31 has an inner circumference formed with inner splines 31a and an engagement lip 31b in the axial direction. The inner splines 31a are for spline fitting with the outer splines 23a of the intermediate member 2. The outer splines 23a of the intermediate member 2 and the inner splines 31a of the gear mount 3 constitute a positional adjuster according to the present invention.

The outer chain ring 4 (hereinafter may also called "chain ring 4" as appropriately), is a large-diameter gear having 54 T (teeth) for example, and is made by pressing and grinding a platy material of a predetermined thickness. In the present embodiment, the outer chain ring 4 is provided by an oval gear. The outer chain ring 4 has an inward extensions formed with five though-holes 4a for mounting to the gear mount 3. These though-holes 4a are made to come into alignment with the though-holes 32a in the gear mount 3.

The inner chain ring 5 (hereinafter may also called "chain ring 5" as appropriately) is a small-diameter gear having 40 T (teeth) for example, and is made by pressing and grinding a platy material of a predetermined thickness. In the present embodiment, the inner chain ring 5 is provided by an oval gear. The inner chain ring 5 has an inward extensions formed with five though-holes 5a for mounting to the gear mount 3. These though-holes 5a are made to come into alignment with the though-holes 32a in the gear mount 3.

As shown in FIG. 2 and FIG. 3, the outer chain ring 4 and the inner chain ring 5 are mounted on the gear mount 3 in a sandwiching manner from either side in the axial direction, and are fixed to the gear mount 3 by inserting bolts 7 into though-holes 4a, 32a, 5a and fastening flanged nuts 8 threaded thereto.

The rock ring 6, which connects and fixes the crank arm 1, the intermediate member 2 and the gear mount 3 together, has an inner circumference formed with threads 6a for mating with the threaded shaft 11a of the crank arm 1. The rock ring 6 has an outer circumference formed with grooves 6b to accept a tool for a tightening operation and a loosening operation with respect to the threaded shaft 11a. As clearly shown in FIG. 3, tightening the rock ring 6 against the threaded shaft 11a causes the annular plate portion 22 of the intermediate member 2 and the engagement lip 31b of the gear mount 3 to be caught between the rock ring 6 and the engagement lip 11c of the crank arm 1, preventing relative movement of the crank arm 1, the intermediate member 2 and the gear mount 3 in the axial direction. Under this state, the crank arm 1 and the intermediate member 2 are splined with each other, and so are the intermediate member 2 and the gear mount 3. Therefore, these members 1, 2, 3 are relatively non-rotatable to each other.

According to the bicycle gear crank A of the above-described arrangement, the gear mount 3 for mounting the chain rings 4, 5 is a separate member from the crank arm 1, and the crank arm 1 and the gear mount 3 are interfaced by the intermediate member 2. Further, the intermediate member 2 and the gear mount 3 which are splined together by means of the outer splines 23a and the inner splines 31a are adjustable to each other in terms of their relative circumferential positions. On the other hand, the chain rings 4, 5 are bolted to the gear mount 3 which is a separate member from the crank arm 1.

As understood from the description, if it is desired to change the relative circumferential position between the crank arm 1 and the chain rings 4, 5, the rock ring 6 should simply be loosened to change relative spline engagement positions between the intermediate member 2 and the gear mount 3, without any need to remove the chain rings 4, 5 from the gear mount 3. Thus, it has become easy to make adjustment on relative circumferential positions between the crank arm 1 and the chain rings 4, 5. Also, spline fitting enables positional adjustment with a simpler structure than other means such as bolting.

In the present embodiment, the chain rings 4, 5 are provided by oval gears. Oval gears which are positioned in such a way that their major axes come to a vertical position when the rider can exert a maximum force onto the pedal are believed to provide efficient propelling. However, the position of the crank arm 1 when the maximum force is exerted to the pedal varies from one bicycle rider to another, and for this reason, there has been a strong requirement for adjustment capability in circumferential positions of the crank arm 1 and the chain rings 4, 5. According to the present embodiment, circumferential adjustment between the crank arm 1 and the chain rings 4, 5 can be made easily and therefore, advantages offered by the arrangement can be duly enjoyed.

In the present embodiment, the intermediate member 2 and the gear mount 3 both have 35 splines, which means a relative rotation by one spline (one pitch) will give approximately 10.3 degrees of angular adjustment. As is clear, use of splines enables fine adjustment on the relative positions between the crank arm 1 and the chain ring 4, 5 with a simple structure.

Also, since the intermediate member 2 is placed between the crank arm 1 and the gear mount 3, it is possible to arrange all the constituent elements for the positional adjustment in a compact manner within a relatively small area around the center. Thus, the present invention is applicable to a case where the chain ring 5 (gear) has a relatively small diameter.

Further, in the present embodiment, the splines comprise an odd number (thirty-five) of splines. Such an arrangement as the above allows a half-pitch shift (about 5.1 degrees) of the spline by making a partial rotation (about 180 degrees) by about half the number of splines (seventeen or eighteen splines). Thus, the arrangement allows even finer adjustment on the relative positioning between the crank arm 1 and the chain rings 4, 5.

Thus far, a specific embodiment of the present invention was described. However, the present invention is not limited to this embodiment, and the present invention may be varied in many ways within the scope of spirit of the invention. Specific shapes, materials and so on of the bicycle gear crank according to the present invention are not limited to the described embodiment.

In the embodiment described above, description was made for an arrangement with two gears (chain rings 4, 5). However, the present invention is not limited to this. The present invention is applicable also to an assembly with only one gear, or with three or more gears.

In the embodiment described above, the though-holes 32a in the gear mount 3 have their centers arranged on the same pitch circle. However, the present invention is not limited to this. For example, the though-holes 32a may have their centers on different pitch circles. In other words, when the gears are provided by oval gears, the though holes 32a may be disposed along the oval circumferential shape. Such an arrangement as the above allows use of a small-diameter gear with 39 T or smaller number of teeth without causing interference between the chain on the gear and the tips of the gear mount. Further, since positional adjustment is possible between the intermediate member and the gear mount, appropriate position adjustment is possible between the crank arm which is fitted to the intermediate member and the gear which is mounted to the gear mount even if the gear mount though-holes are located on different pitch-circles.

What is claimed is:

1. A bicycle gear crank comprising:
   a crank arm having a base end provided with a boss for mounting to a crank shaft;
   an annular intermediate member non-rotatably and removably fixed to the boss;
   a gear mount non-rotatably and removably fixed to the intermediate member, the gear mount positioned between the intermediate member and the crank arm;
   a gear fixed to the gear mount; and
   a positional adjuster for changing relative rotational position of the gear mount relative to the intermediate member.

2. The bicycle gear crank according to claim 1, wherein the gear comprises an oval gear plate.

3. The bicycle gear crank according to claim 2, wherein the positional adjuster comprises outer splines formed on an outer circumferential surface of the intermediate member, and inner splines formed on an inner circumferential surface of the gear mount for fittingly engaging the outer splines.

4. The bicycle gear crank according to claim 3, wherein the outer splines comprise an odd number of splines.

5. The bicycle gear crank according to any one of claims 1 to 4, wherein the boss has an outer splined surface, and wherein the intermediate member has an inner splined surface for fitting on the outer splined surface of the boss.

6. The bicycle gear crank according to claim 1, further comprising a rock ring threadably coupled to the crank arm.

7. The bicycle gear crank according to claim 6, wherein the intermediate member is positioned between the crank arm and the rock ring.

8. A bicycle gear crank comprising:
   a crank arm having a base end provided with a boss for mounting to a crank shaft;
   an annular intermediate member including inner splines having a first angular pitch and outer splines having a second angular pitch smaller than the first angular pitch, the inner splines non-rotatably and removably fixed to the boss
   a gear mount non-rotatably and removably fixed to the outer splines of the intermediate member;
   a gear fixed to the gear mount; and
   a positional adjuster for changing relative rotational position of the gear mount relative to the intermediate member.

9. The bicycle gear crank according to claim 8, wherein the outer splines comprise an odd number of splines.

10. The bicycle gear crank according to any one of claim 8 or 9, wherein the boss has an outer splined surface, and wherein the inner splines of the intermediate member are fitted on the outer splined surface of the boss.

11. The bicycle gear crank according to claim 8, further comprising a rock ring threadably coupled to the crank arm.

12. The bicycle gear crank according to claim 11, wherein the intermediate member is positioned between the crank arm and the rock ring.

* * * * *